United States Patent [19]
Dutko

[11] Patent Number: 4,518,167
[45] Date of Patent: May 21, 1985

[54] SEALING MEANS

[75] Inventor: Wolodymyr Dutko, Niles, Ill.

[73] Assignee: A. B. Dick Company, Chicago, Ill.

[21] Appl. No.: 502,156

[22] Filed: Jun. 8, 1983

[51] Int. Cl.³ .............................................. F16J 15/34
[52] U.S. Cl. .................................. 277/81 R; 277/152;
277/207 A
[58] Field of Search ..................... 277/81 R, 153, 152,
277/207 A, 136

[56] References Cited
U.S. PATENT DOCUMENTS

| 2,105,777 | 1/1938 | Smith | 277/136 |
| 3,949,972 | 4/1976 | Bell et al. | 277/81 R |
| 4,379,559 | 4/1983 | Bohman | 277/207 A |
| 9,423,526 | 1/1984 | Izzi | 277/207 A |

Primary Examiner—Robert I. Smith
Attorney, Agent, or Firm—McDougall, Hersh & Scott

[57] ABSTRACT

An apparatus such as a printing apparatus employing an ink fountain assembly which includes a roller and metering blade, supported between housing walls for purposes of metering ink in the course of a printing operation. Seals are provided for sealing against leakage of ink in the region of the assembly where the roller ends are journalled for rotation. The seals comprise compressible, annular members mounted at each end of the roller. The seals define mating surfaces for engaging with mounting elements so that the seals are held against rotation as the printing operation takes place. The seals are compressed to provide a snug fit with the roller ends, and they define surfaces which develop a minimum of friction with these engaging roller ends.

19 Claims, 8 Drawing Figures

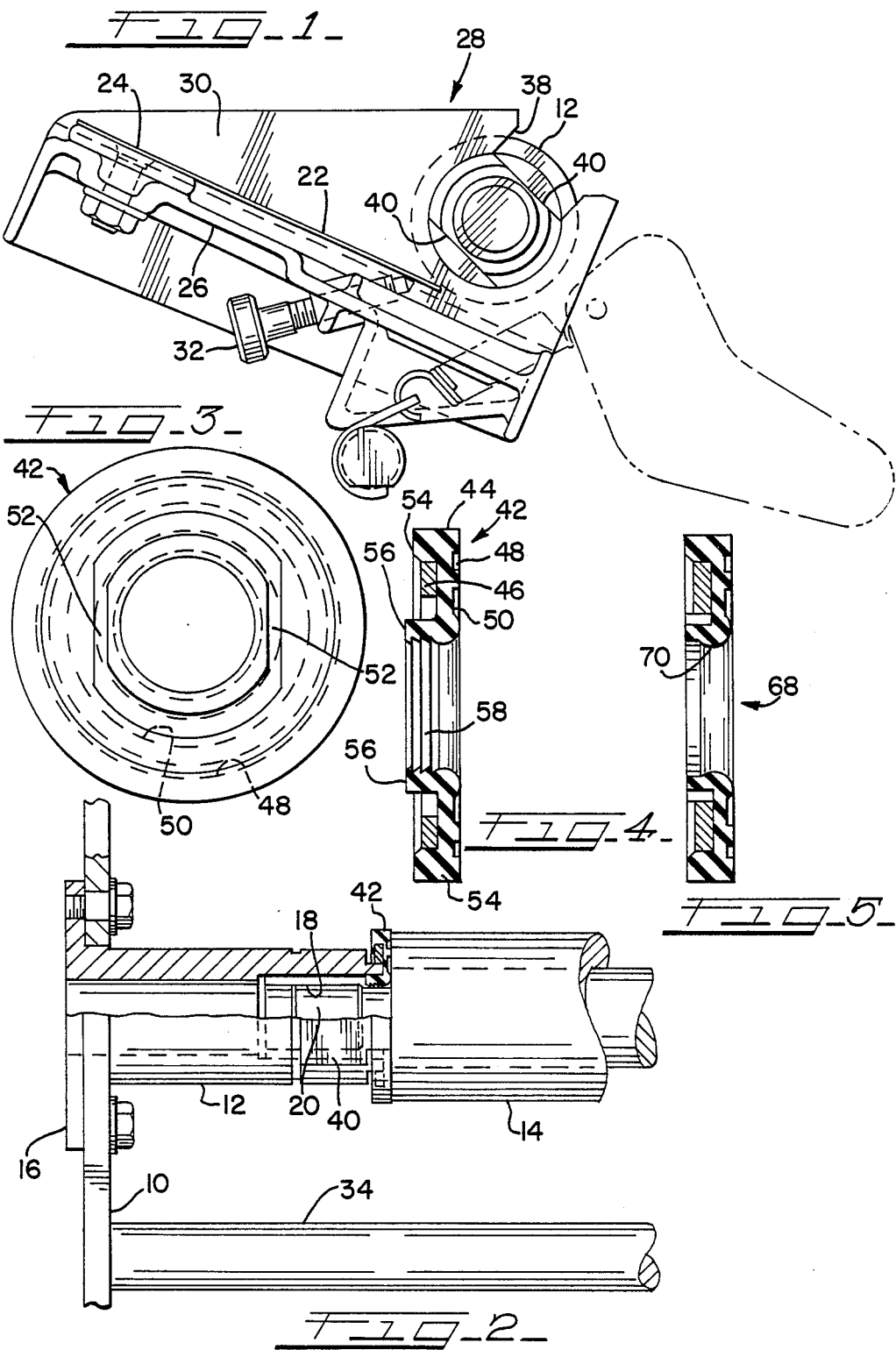

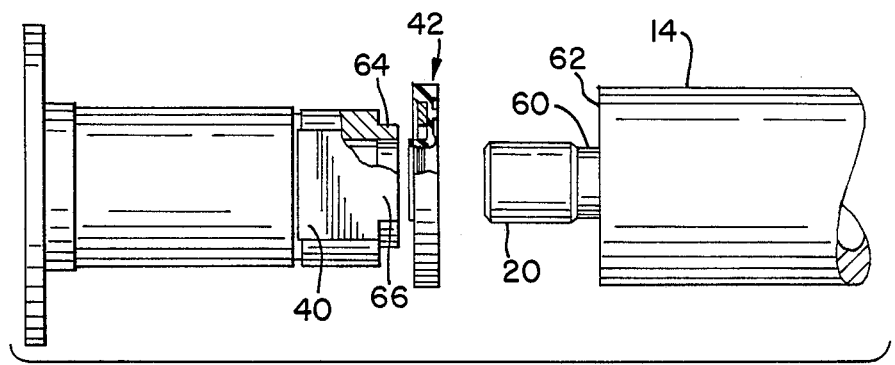
FIG_6_
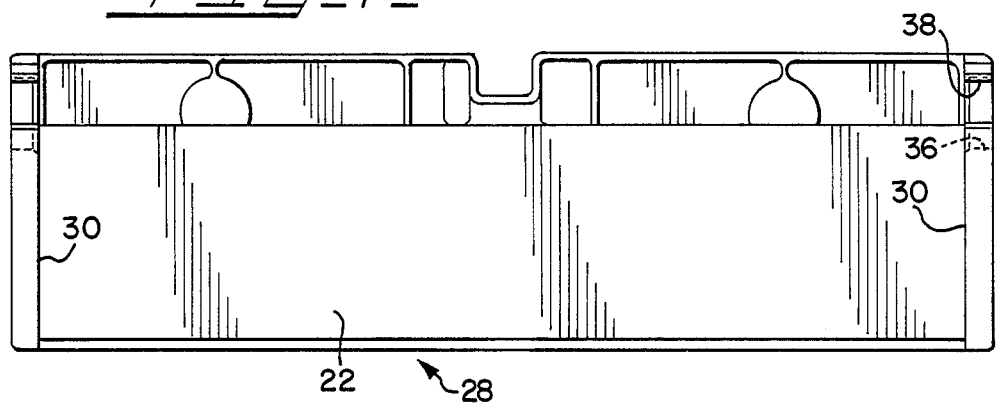
FIG_7_
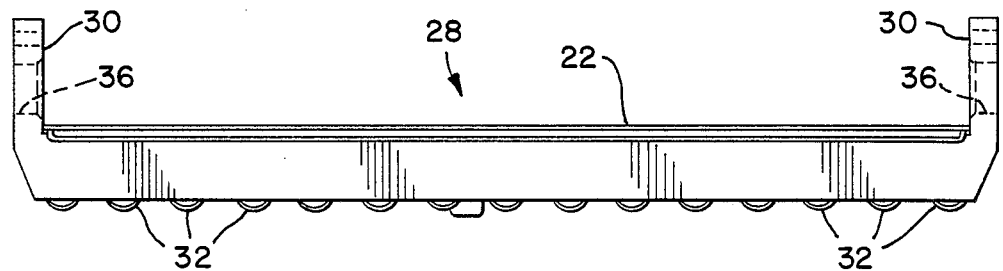
FIG_8_

SEALING MEANS

BACKGROUND OF THE INVENTION

This invention relates to equipment which involves the handling of liquids such as a printing apparatus of the type employing an ink fountain assembly. In such an apparatus, the ink fountain is provided for containing ink, and a roller and metering blade associated with the ink fountain serve to meter the ink to the apparatus in the course of a printing operation.

The following description will be confined to a discussion of a printing apparatus of the aforesaid type in order to illustrate the practice of the invention. It will be understood, however, that the invention is applicable to other equipment which handles liquid, such as coating equipment, and which employs a removable metering means whereby sealing against leakage can become a problem. This would be particularly true where the liquid being handled has a viscosity higher than water.

Concerning the printing application of the invention, it has been recognized that problems develop with ink fountain assemblies due to leakage of printing ink. Thus, ink will drip from the ink fountain onto various parts of a printing apparatus such as a receiving tray and chain delivery means. In addition, ink migration into journal bearings can cause machine malfunction if the ink is allowed to dry. Leakage of ink, therefore, creates definite problems from the standpoint of clean-up and other maintenance and, in addition, ink is wasted whenever such leakage takes place.

Leakage problems have been addressed in U.S. patents to Bechman, U.S. Pat. No. 1,142,659; Swaim, U.S. Pat. No. 1,469,544; Andersson, U.S. Pat. No. 2,218,945; Mueller, U.S. Pat. No. 2,887,049 and Dutro, et al. U.S. Pat. No. 3,135,197. These patentees essentially disclose various proposals for sealing means designed to reduce or eliminate the leakage problem. It has been applicant's experience, however, that such prior art teachings have been ineffective for the intended purposes.

SUMMARY OF THE INVENTION

This invention relates to a printing apparatus of the type including an ink fountain. Typically, an ink fountain comprises a reservoir for holding printing ink including side walls. The reservoir is supported by mounting means associated with housing walls, and a rotatable roller is also supported by these walls. A metering blade associated with the roller controls the amount of ink delivered for printing purposes.

The invention is more specifically concerned with means for sealing the apparatus against leakage of ink in the region of the roller ends. The sealing means employed include compressible annular seals positioned around shaft portions at each end of the roller. The seals fit in mating relationship with mounting means associated with the side walls of the printing apparatus housing and the seals are thereby maintained against rotation during operation of the printing apparatus.

The metering blade assembly is removably held in the apparatus, and this assembly is designed so that the distance between side walls of the assembly is less than the lengthside distance occupied by the roller and associated seals when the assembly is removed. The result is that placing of the assembly in the apparatus results in compression of the seals for achieving a highly effective sealing relationship at the roller ends.

The invention is also particularly concerned with the structure of the individual seals. These seals comprise a two-piece construction including a compressible portion and a rigid insert portion. The insert may be of various designs and is adapted to be engaged in mating relationship with fixed mounting means associated with the apparatus housing. In this fashion, the seals are automatically held against rotation when positioned in the apparatus.

The seals include faces engaging the respective ends of the ink fountain roller. Grooves are defined by the seal faces in order to minimize frictional engagement with the roller ends and to stop ink migration along the face of the seal. This reduces the energy required for driving the roller and enhances the ability of the seals to prevent leakage.

The compressible portion of each seal is dimensioned so that before installation the inner diameter of its annular opening is less than the outer diameter of the roller shaft portion on which the seal is to be positioned. In addition, the shaft portion is undercut in the region immediately adjacent the roller whereby each seal is tightly fit in place at the respective roller ends.

The respective seals each define an outer diameter greater than the outer diameter of the roller. The enlarged perimeters of the seals thereby provide barriers against the passage of ink laterally beyond the ends of the rollers. This seal feature thereby enhances the ability of the seals to prevent leakage.

DESCRIPTION OF THE DRAWINGS

FIG. 1 is a side elevation illustrating an ink fountain construction including a metering blade;

FIG. 2 is a fragmentary, front elevation, partly in section, illustrating a mounting means and roller of the type used in association with an ink fountain;

FIG. 3 is a plan view of a seal adapted to be employed in an ink fountain construction;

FIG. 4 is a vertical, cross-sectional view taken about the line 4—4 of FIG. 3;

FIG. 5 is a horizontal cross-sectional view of an alternative form of seal;

FIG. 6 is a fragmentary, exploded view, partly in section, of the mounting means, seal and roller shown in FIG. 2;

FIG. 7 is a plan view of an ink fountain assembly of the type shown in FIG. 1; and FIG. 8 is a front end view of the ink fountain assembly.

DESCRIPTION OF PREFERRED EMBODIMENTS

The apparatus of this invention generally comprises a printing apparatus of the type employing an ink fountain. The embodiment of the invention illustrated comprises a printing apparatus having a housing wall 10 supporting a mounting means 12 for ink roller 14. As best shown in FIG. 2, the mounting means includes a flange 16 for attachment of the mounting means to the housing wall 10. The mounting means also defines a bore 18 which is dimensioned to receive the reduced diameter shaft portion 20 of the roller 14.

The roller 14 operates in conventional fashion in connection with metering blade 22. As shown in FIG. 1, the metering blade is attached at 24 to the transverse portion 26 of the metering blade assembly 28. This assembly also includes side walls 30, and the combination of the metering blade assembly, side walls, and roller 14 provides a reservoir for holding printing ink. A plurality of adjusting screws 32 are utilized for adjusting the position of the metering blade relative to the roller periphery. As shown in FIG. 8, these adjusting screws are located in spaced-apart positions along the length of the metering blade so that different adjustments can be made along this length depending upon the ink demands at a particular location during a printing operation.

The housing wall 10 shown in FIG. 2 is connected by means of one or more tie rods 34 to an opposite housing wall, and the roller 14 is supported at its opposite end to a corresponding mounting means 12 attached to the opposite housing wall. The side walls 30 of the metering blade assembly 28 each define an opening 36 having a diameter permitting fitting of the assembly around the respective mounting means 12. Flats 40 are defined on opposite sides of the respective mounting means and a passage 38 communicating with opening 36 is dimensioned so that the metering blade assembly 28 can be fit onto the mounting means by passing the respective passages 38 over the respective flat portions 40. As shown in FIG. 1, the metering blade assembly is then rotated relative to the mounting means whereby the assembly is held in place in the operating position shown. The metering blade assembly can, of course, be removed by rotating it back to the position where the passage 38 is aligned with flats 40.

When the metering blade assembly is positioned relative to the mounting means 12, the opposed inner faces of the walls 30 are brought into engagement with seals 42 which are located at the opposite ends of roller 14. The combined dimensions of the roller and seals are such that prior to locating the metering blade assembly in place, they exceed the distance between the inner faces of the assembly walls 30. Accordingly, when the metering blade assembly is positioned relative to the roller 14, the respective inner faces of the walls 30 engage the seals 42 and press these seals against the end faces of the roller 14. This arrangement insures a tight fit for the seals relative to the rollers.

The seals 42 are shown in detail in FIGS. 3 and 4, and they comprise annular members formed of two pieces including a compressible portion 44 and a rigid insert 46. The compressible portion may comprise a synthetic elastomer material or rubber material while the insert portion may comprise a steel member or equivalent rigid material.

Annular grooves 48 and 50 are defined on the inner face of each seal and, as best shown in FIG. 2, this grooved face will be pressed into engagement with an end face of roller 14 when the metering blade assembly is located in position as previously explained. The provision of the grooves minimizes the surface-to-surface contact of the respective faces to thereby minimize the amount of friction during operation. This arrangement also maximizes pressure in the sealing areas thereby serving to stop ink migration along the face of each seal into the roller bearing.

The rigid insert 46 defines a washer shape with straight side edges 52. The entire outer periphery, including the outer portion of the straight side edges 52, conforms with the inner face of wall 54 defined by the compressible portion 44 of the seal. In practice, the rigid insert 46 can be located in a mold with the compressible portion 44 then being molded around the rigid portion to form an assembly of these parts.

An inner annular wall portion 56 is defined by the compressible portion. This inner wall portion defines a serrated interior surface 58 which will directly engage an undercut surface 60 of the roller 14 shaft portion 20 when the seal is located in position in the apparatus.

As best shown in FIG. 6, the shaft portion 20 of roller 14 includes the undercut 60 in the area immediately adjacent the end face 62 of the roller. The inner diameter of inner wall 56 of the seal 42 is preferably slightly less than the outer diameter of the undercuts 60. When the roller is assembled as shown in FIG. 2, the inner wall 56 of the seal surrounds the surface of the undercut 60 and will be snugly engaged relative to this surface in view of the relative diameters. The provision of the serrated surface 58 has been found to be particularly effective as a barrier to the migration of ink along the shaft portion 20. The provision of the undercuts 60 provides an additional feature tending to minimize such migration.

The mounting means 12 which support the respective ends of the roller 14 include an annular shoulder 64 which is dimensioned to be received between the inner edge of rigid insert 46 and the adjacent inner wall of the compressible portion 44 of the seal. It will be noted that opposite outer faces 66 of the shoulder 64 comprise continuations of the flats 40 defined by the mounting means 12 whereby the shoulder 64 comprises a non-circular configuration. By providing a configuration as illustrated for the annular shoulder 64, the seal will be automatically restrained against rotation once it is located on the mounting means. Thus, the respective non-circular configurations for the rigid insert 46 and shoulder 64 achieve a mating relationship whereby the seal will remain stationary in the apparatus even though it is snugly engaged with the rotating face 62 of roller 14.

FIG. 5 illustrates a seal 68 of a somewhat modified configuration. In this instance, an annular bulbous portion 70 is formed on the inside wall of the seal. The portion 70 will have an inner diameter less than the outer diameter of the undercut 60 so that the seal 68 will fit snugly on the undercut surface 60 of the roller shaft. The arrangement of FIG. 5 is otherwise essentially the same as described with reference to the seal 42, and this arrangement also provides a highly effective means for avoiding leakage problems in constructions of the type described.

It will be understood that various changes and modifications may be made in the above described apparatus which provide the characteristics of the invention without departing from the spirit of the invention particularly as defined in the following claims.

I claim:

1. In an apparatus of the type handling liquid and including an assembly having a roller and associated metering means, and mounting means for rotatably supporting said roller at its ends and for supporting said metering means, the improvement in sealing means for sealing against leakage of liquid in the regions of said roller ends, said sealing means including compressible, annular seals mounted at each end of said roller, respective mating means defined by said mounting means and said seals for holding the seals against rotation relative to the mounting means, side walls defined by said metering means, and wherein said seals are compressed between said side walls and the roller ends when the metering means is supported in the apparatus, and whereby said sealing is accomplished in said regions where the respective roller ends are rotating while engaged with the respective stationary annular seals.

2. An apparatus in accordance with claim 1 wherein said side walls define opposed inner faces, said inner faces directly engaging said seals when the metering means is in place to compress each seal between one of said inner faces and an end face of said roller.

3. An apparatus in accordance with claim 1 wherein said respective mating means comprise a noncircular extension defined by said mounting means, and a recess having dimensions corresponding to said extension defined by each seal whereby each extension is receivable within a seal recess.

4. An apparatus in accordance with claim 3 wherein said seal comprises a two-piece structure including a compressible body and a rigid insert, the recess for receipt of an extension being partly defined by said insert.

5. An apparatus in accordance with claim 1 wherein each seal defines a face for engagement with an end face of said roller, and including grooves defined by said seal face for minimizing friction between said seal face and said roller face and for stopping ink migration along said seal face.

6. An apparatus in accordance with claim 1 wherein said roller defines a smaller diameter shaft portion at each end thereof, each seal defining an opening for receiving a shaft portion, the diameter of said opening being less than the outer diameter of a shaft portion whereby said seal is fit snugly around said shaft portion.

7. An apparatus in accordance with claim 6 including an undercut defined by each shaft portion immediately adjacent each end face of said roller, said seal being seated in said undercut.

8. An apparatus in accordance with claim 1 wherein the outer diamter of each seal is greater than the outer diameter of said roller whereby the seals provide a barrier to passage of ink laterally beyond the ends of the roller.

9. A seal for use in association with a roller employed in an apparatus for sealing against leakage of liquid in the region of the roller ends, said seal comprising a compressible, annular seal adapted to be positioned at each end of said roller, said seal comprising a two-piece structure including a compressible body and a rigid insert, and a recess defined between said body and said insert, said recess being adapted to receive means carried by the apparatus for maintaining the seal against rotation during operation of the apparatus.

10. A seal in accordance with claim 9 wherein said seal is adapted to be fit around a smaller diameter shaft portion formed at each end of said roller, and wherein the side of said seal opposite the side defining said recess defines a face adapted to be pressed against an end face of said roller.

11. A seal in accordance with claim 10 including grooves defined by said opposite side of said seal for minimizing friction between said seal face and said roller face.

12. A seal in accordance with claim 10 comprising an opening receiving said shaft portion, the diameter of said opening being less than the outer diameter of a shaft portion whereby said seal is fit snugly around said shaft portion.

13. A seal in accordance with claim 12 including an undercut defined by each shaft portion immediately adjacent each end face of said roller, said seal being adapted to be seated in said undercut.

14. A seal in accordance with claim 9 having an outer diameter greater than the outer diameter of said roller whereby each seal provides a barrier to passage of liquid laterally beyond the end of the roller.

15. A seal in accordance with claim 9 comprising an opening for receiving a shaft portion defined by said roller, said opening defining an internal surface, said internal surface defining serrations spaced longitudinally of the axis of said opening.

16. A seal in accordance with claim 9 comprising an opening for receiving a shaft portion defined by said roller, said opening defining an internal surface, said internal surface defining a bulbous portion for engagement with said shaft portion.

17. A seal in accordance with claim 9 wherein said rigid insert is formed of metal, said compressible body comprising an elastomer material molded around said insert.

18. A seal in accordance with claim 17 wherein said insert defines a non-circular opening.

19. A seal in accordance with claim 18 wherein said compressible body defines an annular inner wall, said inner wall being of lesser diameter than the opening in said insert whereby said recess is defined between said insert and said annular wall.

* * * * *